(12) United States Patent
Chades et al.

(10) Patent No.: US 9,616,597 B2
(45) Date of Patent: Apr. 11, 2017

(54) MOLD COMPRISING A CAVITY FOR MOLDING A CLOSING-OFF DEVICE IN A GROOVE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Wilfried Chades, Clermont-Ferrand (FR); Richard Barriere, Clermont-Ferrand (FR); Bernard Villeneuve, Clermont-Ferrand (FR)

(73) Assignees: COMPAGNIE GENERALE DES ETABLISSEMENTS MICHELIN (FR); MICHELIN RECHERCHE ET TECHNIQUE S.A. (CH)

( * ) Notice: Subject to any disclaimer, the term of this patent is extended or adjusted under 35 U.S.C. 154(b) by 381 days.

(21) Appl. No.: 14/360,268

(22) PCT Filed: Nov. 23, 2012

(86) PCT No.: PCT/EP2012/073437
§ 371 (c)(1),
(2) Date: May 22, 2014

(87) PCT Pub. No.: WO2013/076235
PCT Pub. Date: May 30, 2013

(65) Prior Publication Data
US 2014/0305565 A1    Oct. 16, 2014

(30) Foreign Application Priority Data

Nov. 25, 2011   (FR) ...................................... 1160776

(51) Int. Cl.
*B29D 30/06*     (2006.01)
*B29C 33/42*     (2006.01)
(Continued)

(52) U.S. Cl.
CPC .......... *B29C 33/42* (2013.01); *B29D 30/0606* (2013.01); *B60C 11/13* (2013.01);
(Continued)

(58) Field of Classification Search
CPC ........ B29D 30/0606; B29D 2030/0612; B29D 2030/0617; B29C 33/10; B29C 33/42; B60C 11/13; B60C 2011/1361
See application file for complete search history.

(56) References Cited

U.S. PATENT DOCUMENTS 5,800,642 A * 9/1998 Ohya ................. B29D 30/0606
                                                     152/209.1
6,119,744 A * 9/2000 Tsukagoshi ......... B60C 11/0309
                                                     152/209.19
(Continued)

FOREIGN PATENT DOCUMENTS

DE      60008156 T2    12/2004
EP       1557250 A1     7/2005
(Continued)

OTHER PUBLICATIONS

PCT/EP2012/073437, International Search Report (ISR), Form PCT/ISA/210, dated Feb. 28, 2013 (including English translation), 7 pgs.

*Primary Examiner* — James Mackey
(74) *Attorney, Agent, or Firm* — Dickinson Wright PLLC (57) ABSTRACT

A molding element for a mold for vulcanizing a tread of a tire, comprising a base able to mold part of the tread surface of the tread and a bar able to mold a groove in the tread, the bar comprising two longitudinal faces extending along its
(Continued)

length and projecting from the base and an upper face connecting the longitudinal faces. The molding element comprises a contact edge formed by the base and the bar, intended to come into contact with another molding element to form all or part of the vulcanizing mold, and further comprising at least one recess in the bar, which opens onto the upper face and onto the contact edge, but does not open onto the longitudinal faces of the bar.

9 Claims, 5 Drawing Sheets

(51) Int. Cl.
  *B60C 11/13* (2006.01)
  *B29C 33/10* (2006.01)
(52) U.S. Cl.
  CPC ...... *B29C 33/10* (2013.01); *B29D 2030/0612* (2013.01); *B29D 2030/0617* (2013.01)

(56) References Cited

U.S. PATENT DOCUMENTS

| | | | |
|---|---|---|---|
| 8,506,275 B2* | 8/2013 | Villeneuve | B29C 33/10 |
| | | | 425/28.1 |
| 2006/0257511 A1 | 11/2006 | Iwamoto et al. | |
| 2011/0146863 A1* | 6/2011 | Ochi | B60C 11/0306 |
| | | | 152/209.18 |
| 2012/0114777 A1 | 5/2012 | Villeneuve et al. | |

FOREIGN PATENT DOCUMENTS

| | | | |
|---|---|---|---|
| JP | 4353432 A | 12/1992 | |
| JP | 8025365 A | 1/1996 | |
| JP | 8072061 A | 3/1996 | |
| JP | 2000343916 A | 12/2000 | |
| KR | 100694179 B1 | 3/2007 | |
| WO | 2004048062 A1 | 6/2004 | |
| WO | 2010146180 A1 | 12/2010 | |

\* cited by examiner

MOLD COMPRISING A CAVITY FOR MOLDING A CLOSING-OFF DEVICE IN A GROOVE

This application is a 371 National Stage Application of PCT/EP2012/073437, filed Nov. 23, 2012, which claims the benefit of FR1160776, filed Nov. 25, 2011, the entire contents of each of which are incorporated herein by reference for all purposes.

BACKGROUND

1. Field

The present field relates to the field of the manufacture of a mold for a tire comprising a plurality of cavities which are able to mold closure devices in one or more groove(s) of this tire. More particularly, the field relates to the manufacture of a mold formed from a plurality of molding elements.

2. Description of Related Art

Document WO 2010146180 discloses a vulcanizing mold for a tire comprising a plurality of molding elements. Each molding element is delimited by two edges in contact with two other adjacent molding elements so that once the molding elements are in contact with one another, all of these molding elements together allow all or part of the tread of the tire to be molded.

Each molding element comprises a base and a bar projecting from this base. The base is intended to mold the tread surface of the tread of the tire and the bar is intended to mold a groove in the tread of this tire, i.e. a cut of a width greater than or equal to 2 mm.

It is known that, in the contact patch in which the tread is in contact with the road surface, each groove forms a resonance tube with this road surface. This resonance tube amplifies the running noise of the tire, and this may be unpleasant for people situated inside the vehicle and/or outside this vehicle.

In order to limit the intensity of this resonant noise, it is known practice to provide the grooves with special closure devices also referred to as "flexible walls" or "flaps". These closure devices take the form of thin blades. These blades partially close off the cross section of the grooves when the tire is running on a dry road surface. When it is running on a wet road surface, the blades flex under the action of the flow of water, so that this water can be removed from the contact patch between the tire and the road surface. The grip of the tire on the road surface is thus maintained even when running under severe wet conditions. Such an example of a closure device is notably known from document WO 2010063749.

To mold these closure devices, document WO 2010146180 discloses a molding element comprising a bar provided with housings designed to accept inserts, each insert comprising a molding cavity for molding a closure device. The bar of the molding element is therefore discontinuous because it is punctuated by the housings that accommodate the inserts.

For certain types of tire such as winter or snow tires it is known practice to provide the tread with sipes. A sipe means a cut of a width less than 2 mm. These sipes are molded by sipe blades that project from the base of the molding element. To improve the mechanical strength of these sipe blades it is generally contrived for these to be formed as one with the bar of the molding element, i.e. for the sipe blades and the bar to be produced at the same time during one and the same molding operation. Now, the inserts are manufactured during a step which is different from the step of molding the sipe blades and the bar. Thus, if sipe blades are to be positioned in line with inserts, for example because of a special design of the tread, it is necessary to resort to an additional step of welding these sipe blades to the inserts. This leads to additional manufacturing costs.

It is therefore an object of embodiments of the invention to improve the overall mechanical strength of a mold made up of several molding elements and comprising cavities for molding closure devices, while at the same time optimizing the cost of manufacturing this mold.

DEFINITIONS

A "tire" means all types of resilient tread whether or not it is subjected to an internal pressure.

The "tread" of a tire means a quantity of rubber compound delimited by lateral surfaces and by two main surfaces, one of which is intended to come into contact with a road surface when the tire is being driven on.

A "tread surface" means the surface formed by those points of the tread of the tire that come into contact with the road surface when the tire is being driven on.

A "mold" means a collection of separate molding elements which, when brought relatively closer together, delimit a toroidal molding space.

A "molding element" means part of a mold. A molding element is, for example, a mold segment.

A "base" means that part of the molding element that comprises a molding surface able to mold the tread surface of the tread of the tire. The base notably comprises attachment means intended to attach the molding element to the rest of the mold.

A "bar" means a protuberance projecting from the base and of a width greater than or equal to 2 mm. The bar is intended to mold a groove in the tread of a tire.

A "cavity" in a mold means a hollow volume delimited by walls of the mold. This cavity is able to mold a closure device in a groove molded by a bar.

A "recess" in a bar means a hollow in the bar that opens onto a contact edge of the molding element. This recess is able to be closed at the contact edge of this molding element by another molding element with a view to forming a cavity.

A "contact edge" of a molding element means a surface of the molding element that is intended to come into contact with another molding element to form all or part of a vulcanizing mold.

SUMMARY

The invention in certain embodiments relates to a molding element for a mold for vulcanizing a tread of a tire. This molding element comprises a base able to mold part of the tread surface of the tread and a bar able to mold a groove in the tread. The bar comprises two longitudinal faces extending along the length of the bar and projecting from the base and an upper face connecting the longitudinal faces. The molding element comprises a contact edge formed by the base and the bar. This contact edge is intended to come into contact with another molding element to form all or part of the vulcanizing mold. The molding element comprises at least one recess in the bar. This recess opens onto the upper face of the bar and onto the contact edge of the molding element. This recess does not open onto the longitudinal faces of the bar.

The recess formed in the molding element is intended to be closed by another molding element of the mold to form a molding cavity for molding a closure device. The invention therefore makes it possible to form molding cavities in a way that is simple and practical.

In addition, since the recess formed in the molding element does not open onto the longitudinal walls of the bar, this bar is not discontinuous. Thus it is possible to mold sipe blades formed as one with the bar and to do so regardless of the positions that these sipe blades occupy relative to the bar.

Finally, given that the recess of the molding element opens onto the edge of this molding element, the walls of the molding element delimiting this recess are readily accessible, notably before this molding element is assembled in the mold. Thus, it is possible to coat these walls with a non-stick coating, such as xylan. By using this non-stick coating, the demolding of the closure devices becomes easier.

In an alternative form of embodiment, the molding element comprises in the bar a first recess and a second recess, each of these recesses opening onto the upper face of the bar and onto the contact edge of the molding element, neither one of these recesses opening onto the longitudinal faces of this bar.

Two closure devices belonging to one and the same transverse plane can thus be moulded in one and the same groove, these two closure devices being fixed in the bottom of the groove. This is of particular benefit when the groove is of great width, for example more than 15 mm wide. Specifically, two closure devices each closing half the width of the groove exhibit overall greater flexibility than a single device extending across the entire width of this groove. These two closure devices therefore exhibit a good ability to flex when driving over a wet road surface. The removal of water from the contact patch in which the tread is in contact with the road surface is thus optimized.

In an alternative form of embodiment, the molding element comprises an air discharge duct, the said discharge duct extending the recess or each recess throughout the thickness of the base.

This then ensures that air trapped in the recess or recesses is properly discharged when the tire is vulcanized.

In an alternative form of embodiment, the molding element comprises means of adjusting the dimensions of the air discharge duct.

This then makes sure that air is correctly discharged when the tire is vulcanized while at the same time preventing rubber from escaping along the discharge duct. This then prevents any surplus rubber moulded by the discharge duct from being formed on the upper part of the closure device. Indeed such a surplus of rubber could detract from the correct operation of this closure device.

In an alternative form of embodiment, the molding element comprises means of adjusting the height of the recess or of each recess in the bar.

As the tire cools once it has been molded, it may happen that the closure device shrinks, thereby altering its height in the groove of the tire. The significance of this shrinkage phenomenon is difficult to quantify. This is because this phenomenon is dependent on numerous factors such as the volume of rubber that forms the closure device, the vulcanization temperature conditions and the rubber composition used. In order to give the tire a uniform appearance when the tire is in the as-new condition, it is advantageous to make the upper part of the closure device lie flush with the tread surface of the tread. By providing means of adjusting the height of the recess, it is possible, through trial and error, to obtain a closure device at a suitable height to guarantee the tire a uniform appearance.

Another embodiment of the invention relates to a mold for vulcanizing a tread of a tire. This mold comprises a plurality of molding elements. These molding elements are in contact with one another to form a molding surface able to mold a tread surface of the tread of the tire. These molding elements also form at least one bar able to mold a groove in the tread. This bar comprises two longitudinal faces extending along the length of the bar and projecting from the molding surface and an upper face connecting these longitudinal faces. The mold that forms the subject of the invention is notable in that it comprises a cavity able to mold a closure device intended to close off all or part of a cross section of the groove moulded by the bar. This cavity opens onto the upper face of the bar and does not open onto the longitudinal faces of this bar so that the closure device moulded by the cavity is formed as an integral part only of the bottom of the groove. Furthermore, the cavity is delimited by walls belonging to two molding elements in contact with one another and at least one of the said molding elements is a molding element as described hereinabove.

It is thus possible to manufacture, in a simple and practical manner, a mold capable of molding closure devices in the tread of a tire.

In an alternative form of embodiment, the cavity is formed by two recesses facing one another, each recess respectively belonging to one of the two molding elements in contact with one another.

It is thus possible to manufacture a cavity by bringing together two recesses belonging to two different molding elements. Each recess may be formed during a pressing operation, i.e. by deforming the material. As the depth of each recess is limited, there is therefore less material to be deformed, so the pressing operation is therefore simplified.

In an alternative form of embodiment, the cavity comprises just one recess belonging to one of the two molding elements. This cavity is formed by the recess and by a contact edge belonging to the other molding element. This contact edge therefore closes the recess.

Thus, there is no need for the other molding element that closes the recess to comprise a recess itself. It is therefore possible to use standard molding elements with no recess in the manufacture of the mold. The cost of manufacturing this mold is thus limited.

In an alternative form of embodiment, the width of the cavity is comprised between 0.1 mm and 2 mm.

It is thus possible to mold closure devices of small thickness. This small thickness of the closure devices gives them a good ability to flex when driving over a wet road surface.

Another embodiment of the invention relates to a tire tread moulded and vulcanized using a mold as described hereinabove.

BRIEF DESCRIPTION OF THE DRAWINGS

Further features and advantages of the invention will become apparent from the following description, given by way of nonlimiting example, with reference to the attached drawings in which.

DETAILED DESCRIPTION OF SPECIFIC EMBODIMENTS

In the description which follows, elements which are substantially identical or similar will be denoted by identical references.

Figure 1:
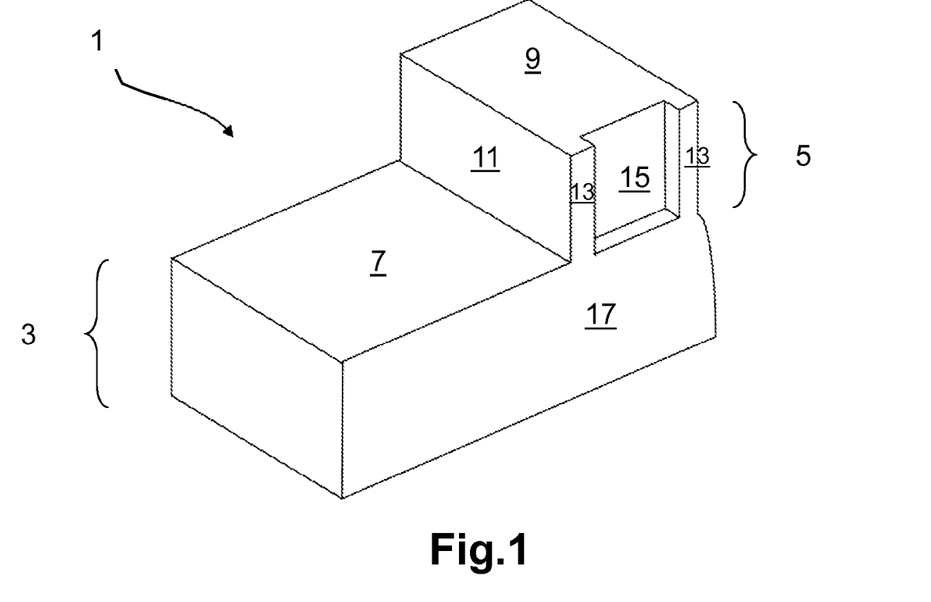
FIG. 1 schematically depicts a partial perspective view of a molding element according to a first embodiment of the invention.

FIG. 1 schematically depicts a perspective view of a molding element 1 of a mold according to a first embodiment of the invention. To make the invention easier to understand, no sipe blade for molding a sipe has been depicted in this FIG. 1.

The molding element 1 comprises a base 3 and a bar 5 projecting from the said base 3. The base 3 and the bar 5 are in this instance formed as one from the same substance and made of a material of the aluminium type.

More particularly, the base 3 comprises a molding surface 7 intended to mold part of the tread surface of a tire. The bar 5 for its part comprises an upper face 9 intended to mold the bottom of a groove and two longitudinal faces 11, just one of which has been depicted here. These longitudinal faces 11 project from the molding surface 7 of the base 3.

To make the invention easier to understand, the bar 5 has been depicted here as being in the overall shape of a rectangular parallelepiped. Of course, the invention is not restricted to this specific shape of bar. As an alternative, the upper face 9 of the bar may be non-planar, for example domed, so that the bottom of the groove moulded by the upper face of the bar 5 is curved. Similarly, the angle formed by the longitudinal faces 11 with the molding surface 7 of the base 3 may be other than 90°. For example, each longitudinal face may form an angle greater than 0° and less than or equal to 45° with a direction normal to the molding surface 7. Furthermore, the upper face of the bar may comprise parts of a connection with the longitudinal faces 11. These connection parts are, for example, curved so that it is possible to avoid there being any right angles between the bottom of the groove moulded by the upper face of the bar and the longitudinal walls of this groove. This makes it possible to limit the risk of cracks appearing in the groove.

More specifically, the bar 5 comprises two protuberances 13 delimiting a recess 15. This recess is intended to accommodate raw rubber for molding a closure device in a groove of a tire. The protuberances 13 are in this instance arranged in such a way that the recess 15 does not open onto the longitudinal faces 11 of the bar 5. By contrast, the way in which these protuberances 13 are arranged allows the recess 15 to open both onto the upper face 9 of the bar 5 and onto a contact edge 17 of the molding element 1.

Figure 2:
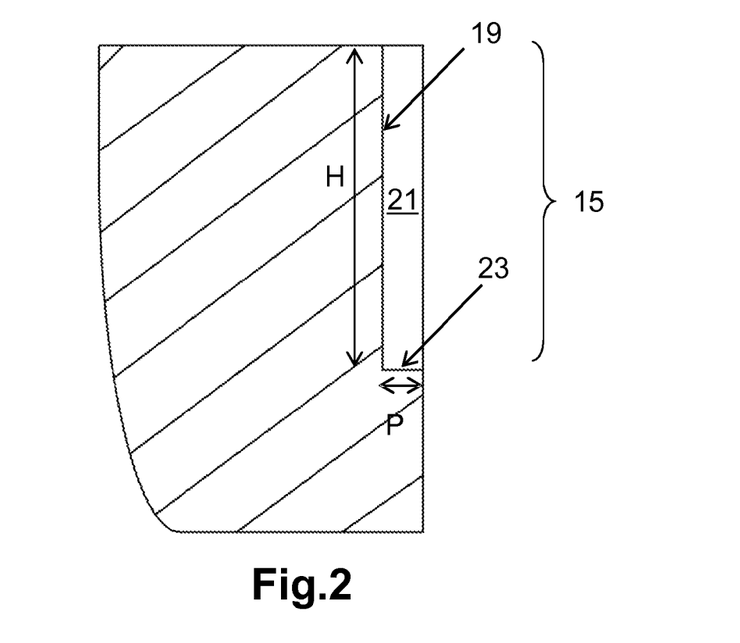
FIG. 2 schematically depicts a view in cross section of the molding element of FIG. 1.

FIG. 2 depicts the recess 15 in greater detail. The recess 15 is thus delimited by a transverse wall 19, by two longitudinal walls 21, just one of which has been depicted here, and by a bottom wall 23. The transverse wall 19 is, in this instance, perpendicular to the two longitudinal walls 21. As an alternative, it is possible for the transverse wall 19 to make an angle other than 90° with each of these longitudinal walls 21.

It will also be noted that the depth P of the recess 15, i.e. the dimension of this recess in the length of the bar, is constant here and comprised between 0.1 mm and 1 mm. As an alternative, the depth of the recess 15 may vary in the height H of this recess 15. This is notably possible when the transverse wall 19 makes an angle other than 0° with a direction normal to the bottom wall 23.

Figure 3:
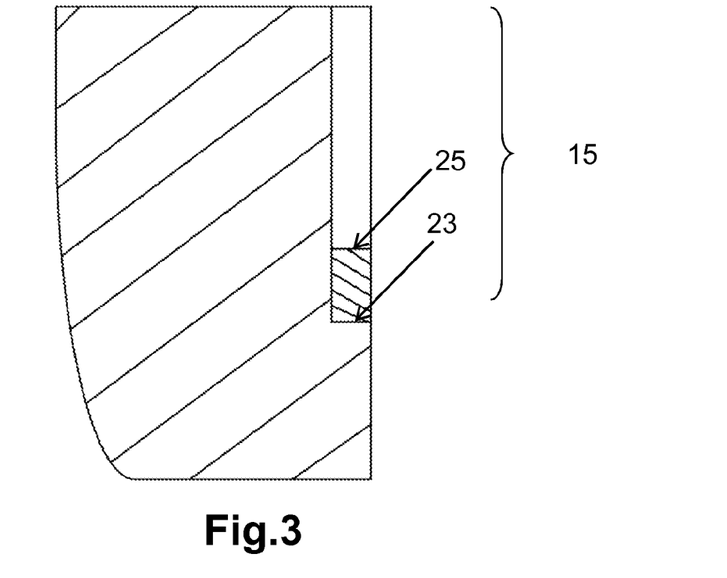
FIG. 3 schematically depicts a view in cross section of a molding element according to a second embodiment of the invention.

FIG. 3 shows an alternative form of embodiment in which an adjusting shim 25 is added to the bottom surface 23. This adjusting shim 25 has a thickness corresponding to the width of the bottom surface 23 and a height that is determined according to the height that the closure device moulded by the recess 15 is to have. The adjusting shim 25 may be formed from the same material as the molding element and is fixed to this molding element by adhesive bonding, screw fastening or any other means.

Figure 4:
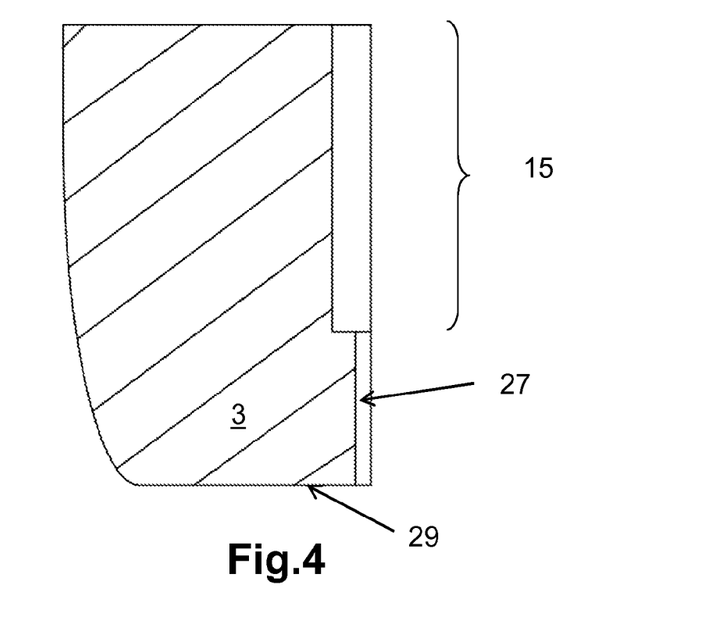
FIG. 4 schematically depicts a view in cross section of a molding element according to a third embodiment of the invention.

FIG. 4 depicts an alternative form of embodiment in which the recess 15 is extended through all the thickness of the base 3 by an air discharge duct 27. Thus, this discharge duct 27 opens onto an external surface 29 of the base. This external surface 29 is able to be in contact with the air while the molding element is in use and, more particularly, while the mold is closed during the vulcanizing step. It will be noted that the depth of the discharge duct 27 is of the order of 0.03 mm. It will also be noted that this duct 27 is, in this instance, depicted as opening onto the contact edge 17 of the molding element. As an alternative, the discharge duct 27 may be delimited wholly by the base 3 and not open onto the contact edge of the molding element.

Figure 5:
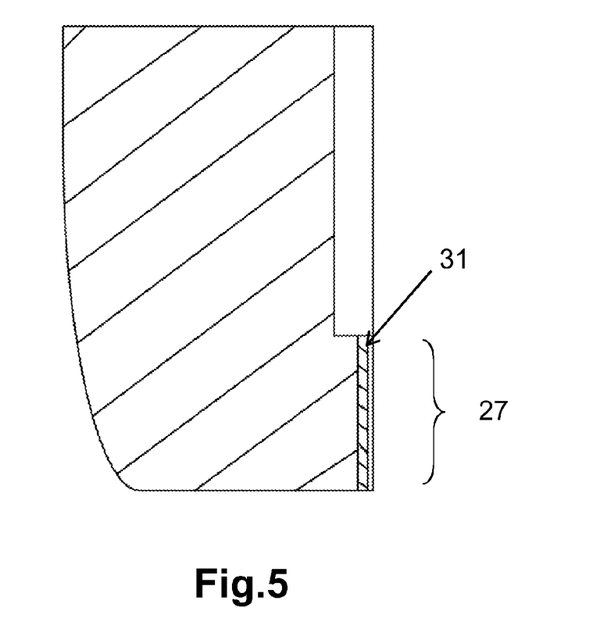
FIG. 5 schematically depicts a view in cross section of a molding element according to a fourth embodiment of the invention.

For preference, the cross section of the discharge duct 27 is partially closed by an obstruction shim 31, as visible in FIG. 5. This obstruction shim 31 extends along the length of the discharge duct 27. Thus it is possible to adjust the cross section of the discharge duct in order to avoid any ingress of raw rubber into this duct during the vulcanizing operation while at the same time allowing air to be discharged from the mold. The obstruction shim 31 may be of different thicknesses according to the raw rubber composition used. It will also be noted that the obstruction shim 31 may be formed from the same material as the molding element and is fixed to this molding element by adhesive bonding, screw fastening or any other means.

In an alternative form of embodiment that has not been depicted, it is possible for the adjusting shim 25 of FIG. 3 and the obstruction shim 31 of FIG. 5 to form a single component.

Figure 6:
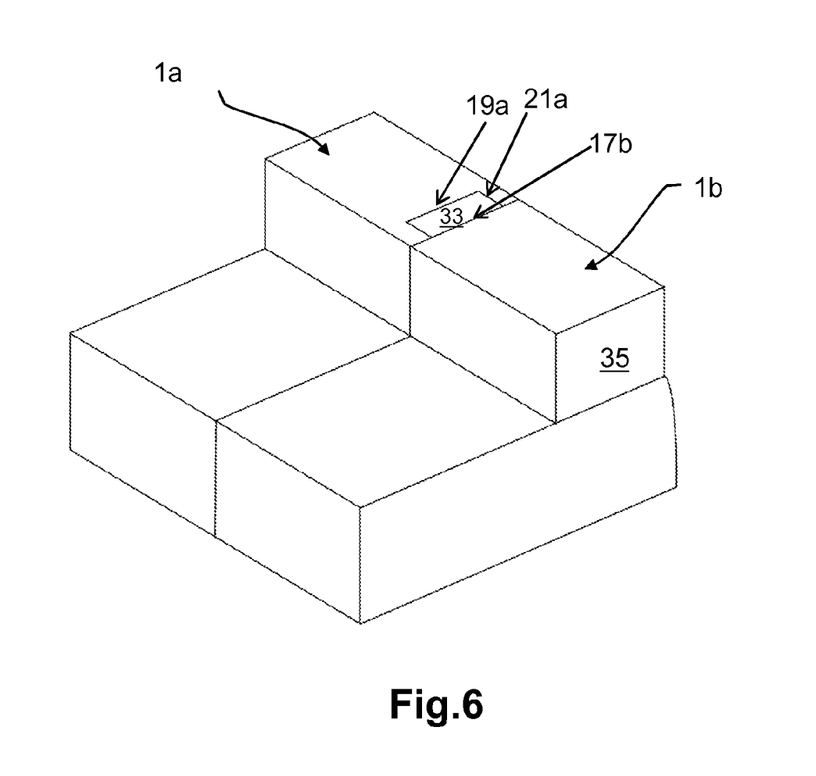
FIG. 6 depicts a molding cavity formed from two recesses, each of these recesses belonging to a respective molding element.

FIG. 6 depicts part of a vulcanizing mold for vulcanizing a tread of a tire. This mold part comprises a first molding element 1a and a second molding element 1b in contact with one another. These molding elements form a molding cavity 33 for molding a closure device that closes the section of a groove formed by the bar 35. More specifically, the cavity 33 is delimited by walls belonging to the first molding element 1a, such as a transverse wall 19a, two longitudinal walls 21a and a bottom wall which is not visible here. The cavity 33 is also delimited by a contact surface 17b belonging to the second molding element 1b. It will be noted that the width of the cavity 33 is comprised between 0.1 mm and 2 mm.

Figure 7:
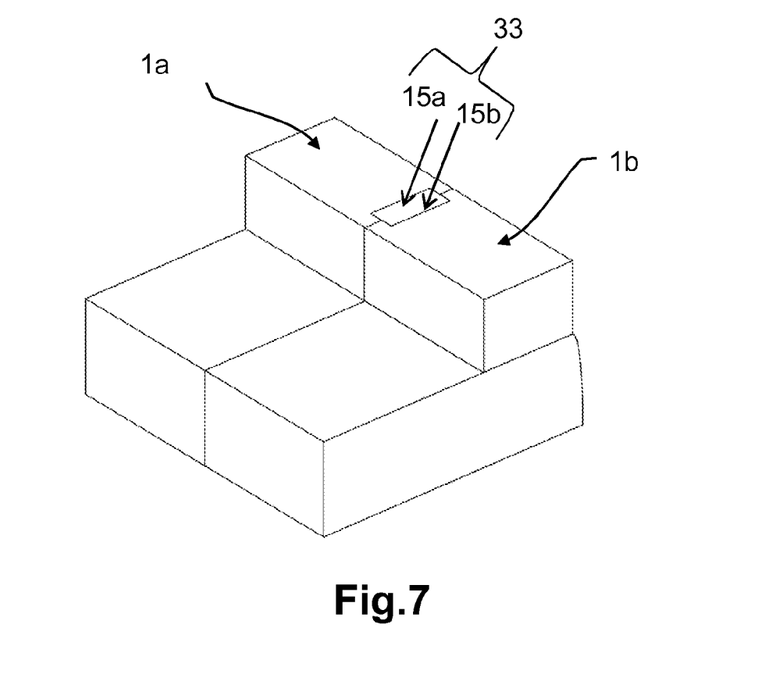
FIG. 7 depicts a molding cavity formed from a single recess.

FIG. 7 shows an alternative form of embodiment in which the cavity 33 of the mold is formed by two recesses 15a and 15b each one belonging to two different molding elements 1a and 1b.

Figure 8:
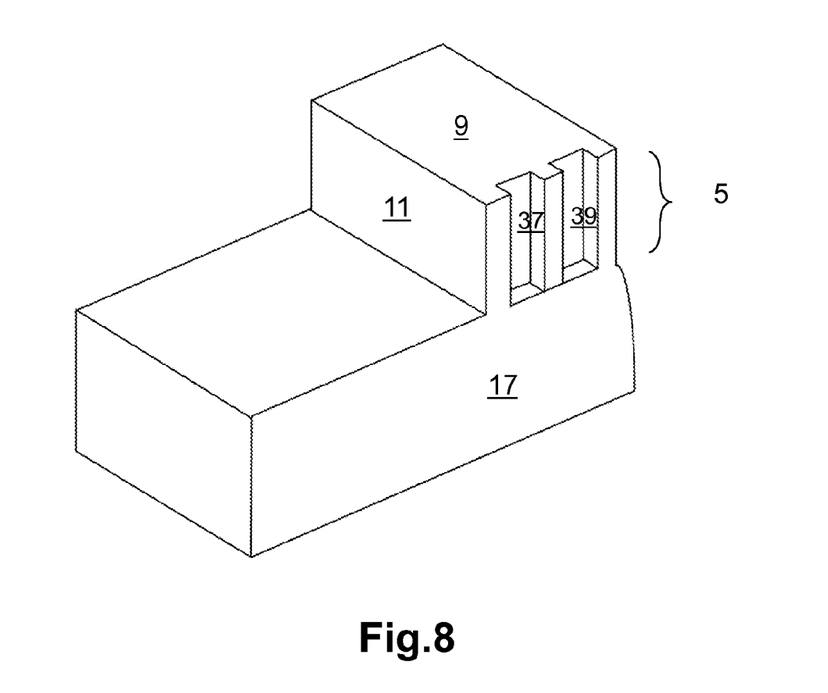
FIG. 8 schematically depicts a perspective view of a molding element according to a fifth embodiment of the invention.

FIG. 8 shows an alternative form of embodiment for a molding element 1 comprising two recesses 37, 39. Each of these recesses opens onto the upper face 9 of the bar 5 and onto the contact edge 17 of the molding element. None of these recesses opens onto the longitudinal faces 11 of the bar. Thus, by virtue of the molding element of FIG. 8 it is possible to mold two closure devices in one and the same groove, each of these closure devices being able to close off part of the cross section of this groove. It will be noted that the two recesses 37, 39 may have different dimensions.

Figure 9:
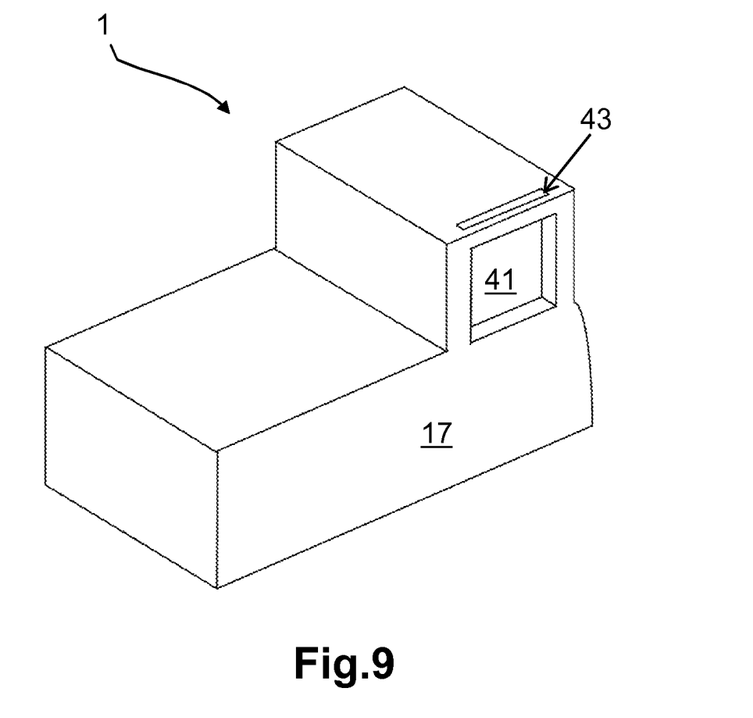
FIG. 9 schematically depicts a perspective view of a molding element according to a sixth embodiment of the invention.

FIG. 9 shows another alternative form of the embodiment of a molding element 1. In this alternative form of embodiment, the recess opens onto the contact edge 17 via an opening 41 which is entirely delimited by the molding element 1 and this recess opens onto the upper face 9 via an orifice 43 entirely delimited by this upper face 9. In this way it is possible to manufacture a closure device which, at its base, has a thickness that is smaller than the rest of the device. This then improves the overall flexibility of the closure device.

The invention also covers tires moulded in a mold formed from assembling molding elements as described hereinabove. These tires thus comprise closure devices in grooves. It will be noted that the use of the tires may be varied (tires for passenger vehicles, tires for heavy vehicles, for winter driving, for driving in the wet, etc.).

The invention is not restricted to the embodiments described and depicted and various modifications can be made thereto without departing from its scope.

The invention claimed is:

1. A molding element for a mold for vulcanizing a tread of a tire, comprising:
   a base able to mold part of the tread surface of the tread, and
   a bar able to mold a groove in the tread, comprising two longitudinal faces extending along a length of the bar and projecting from the base and an upper face connecting the longitudinal faces,
   a contact edge formed by the base and the bar, being intended to come into contact with another molding element to form all or part of the vulcanizing mold,
   at least one recess in the bar, the recess opening onto the upper face of the bar and onto the contact edge of the molding element, but not opening onto the longitudinal faces of this bar.

2. The molding element according to claim 1, wherein the at least one recess of the element comprises a first recess and a second recess, each of these recesses opening onto the upper face of the bar and onto the contact edge of the molding element, neither one of these recesses opening onto the longitudinal faces of this bar.

3. The molding element according to claim 1, wherein the molding element further comprises an air discharge duct, the said discharge duct extending the recess or each recess throughout the thickness of the base.

4. The molding element according to claim 3, wherein the molding element further comprises means of adjusting the dimensions of the air discharge duct.

5. The molding element according to claim 1, wherein the molding element further comprises means of adjusting the height of the recess or of each recess in the bar.

6. A mold for vulcanizing a tread of a tire, comprising a plurality of molding elements, the molding elements being in contact with one another to form a molding surface able to mold a tread surface of the tread of the tire and at least one bar able to mold a groove in the tread, the bar comprising two longitudinal faces extending along a length of the bar and projecting from the molding surface and an upper face connecting the said longitudinal faces, wherein the mold comprises at least one cavity able to mold a closure device intended to close all or part of a cross section of the groove molded by the bar, the cavity opening onto the upper face of the bar and not opening onto the longitudinal faces of the bar so that the closure device molded by the cavity is formed as an integral part only of the bottom of the groove, and wherein the cavity is delimited by walls belonging to two molding elements in contact with one another and at least one of the said molding elements is a molding element according to claim 1.

7. The vulcanizing mold according to claim 6, wherein the cavity is formed by two recesses facing one another, each recess respectively belonging to one of the two molding elements in contact with one another.

8. The vulcanizing mold according to claim 6, wherein the cavity comprises just one recess belonging to one of the two molding elements, the cavity being formed by the recess and by a contact edge belonging to the other molding element, the contact edge closing the recess.

9. The vulcanizing mold according to claim 6, wherein the width of the cavity is between 0.1 mm and 2 mm.

* * * * *